United States Patent
Jacoby

[15] 3,661,424
[45] May 9, 1972

[54] GEOTHERMAL ENERGY RECOVERY FROM DEEP CAVERNS IN SALT DEPOSITS BY MEANS OF AIR FLOW

[72] Inventor: Charles H. Jacoby, Dalton, Pa.

[73] Assignee: International Salt Company, Clarks Summit, Pa.

[22] Filed: Oct. 20, 1970

[21] Appl. No.: 82,231

[52] U.S. Cl. ..........................299/4, 61/.5, 165/1, 165/45
[51] Int. Cl. ....................E21b 43/28, F28d 21/00
[58] Field of Search .............165/1, 45; 60/26; 166/254; 61/.5; 299/2, 4, 5

[56] References Cited

UNITED STATES PATENTS

| | | | |
|---|---|---|---|
| 3,348,883 | 10/1967 | Jacoby et al. | 299/4 |
| 3,386,768 | 6/1968 | Jacoby et al. | 299/4 |
| 3,490,513 | 1/1970 | Villanueva | 165/45 X |

Primary Examiner—Ernest R. Purser
Attorney—Bean & Bean

[57] ABSTRACT

There is disclosed a method for abstracting geothermal heat from depths below ground that are inaccessible by commercially practicable bore hole drilling techniques. More particularly, the invention is of a method for extracting heat from such an inaccessible source which comprises forming a cavern or reservoir at an accessible depth in a salt dome or spire which is in thermal communication with the otherwise inaccessible heat source, and flowing air at comparatively low speeds through the cavern in heat-exchange relation with the wall surfaces thereof to absorb heat therefrom, and then flowing it speedily through a relatively small (compared to the cavern volume) passageway to a point of use above ground, whereby it retains a substantial proportion of the heat energy absorbed in the cavern. Such energy is utilized in any suitable manner, one such preferred use being for the evaporation of brine extracted from the cavern during preparation thereof or obtained from neighboring salt deposits.

11 Claims, 4 Drawing Figures

INVENTOR.
CHARLES H. JACOBY
BY
*Bean & Bean*
ATTORNEYS

GEOTHERMAL ENERGY RECOVERY FROM DEEP CAVERNS IN SALT DEPOSITS BY MEANS OF AIR FLOW

BACKGROUND OF THE INVENTION

It is well known that the interior of the earth is extremely hot, and because heat is an essential form of energy utilized in connection with almost all human activities as well as industrial operations, many suggestions have been made of ways to take advantage of this virtually unlimited supply of heat. Because of our constantly increasing needs for energy and rapidly diminishing sources of fossil fuels, as well as our currently serious concern about air and water pollution caused by burning fuels to produce heat and electrical energy, it is vital that commercially feasible methods for extracting "clean" heat from this unlimited source be perfect.

Numerous other systems for such purposes have been previously suggested but have met with only limited success, and are of little if any commercial importance. For example, supplies of hot gases or liquids issuing through fissures in the earth's surface are limited; extremely erratic and productively unreliable; and are usually accompanied by inordinate equipment corrosion and "scaling" problems. None of these other systems previously suggested possess the feasibility potentials of systems utilizing heat derived from inaccessibly deep sources by conduction of such heat part-way towards the earth's surface through a highly heat conductive mineral spire or dome-like geological structure, such heat being then extracted from the structure by forming at some accessible depth therein a heat-exchange cavern or "well" from which "-clean" heat may be extracted and piped to the earth's surface without undesirable loss or contamination. Some such methods have been previously described in my pending U.S. application Ser. Nos. 21,052; 21,051 and 21,082; all filed Mar. 19, 1970.

THE PRESENT INVENTION

In accordance with the present invention, geothermal heat is extracted from an otherwise inaccessible source by a method which comprises first locating a particular type of mineral formation; establishing a heat well or cavern at an accessible depth within said formation; flowing a comparatively cool gas throughout the heat well in heat exchange relation with the wall surfaces thereof; removing the heated gas from the heat well and transporting it to a point where its heat energy may be utilized. A suitable mineral formation is one of high heat conductivity which extends vertically in thermal continuity from a deep-seated heat source at a depth which is inaccessible by commercially practicable bore hole drilling techniques, to a higher level which is accessible by such techniques. The heat well which is established within the formation is at an accessible depth, and deep enough to assure that heat energy flowing from the source into the heat well will be at sufficient temperature and in efficient thermal communication with the deep-seated source of heat so that the heat extracted from the cavern or heat well will be continually replenished so as to make the facility economically feasible. A preferred form of mineral formation for this purpose comprises a salt dome or spire; the sodium chloride crystals of which are not only highly heat conductive by nature, but also are soluble in water and/or various other solvents.

In accordance with this invention it is most desirable that the means employed for extracting heat from the heat well be a gas, preferably a noncondensible gas, which absorbs heat from the cavern walls without extracting or otherwise changing the geometry or condition of the sodium chloride walls thereof. To obtain the best heat extraction performance by the gas which will preferably be air, certain operational parameters will be regulated to be within ranges that have been found to be most effective for efficient heat extraction. For example, the total surface area of the cavern walls will generally not exceed the cross-sectional area of the spire or dome below the cavern, so as to maintain an efficient heat conduction for heat transfer from the very deep source of heat into the cavern. The cavern will be at a depth close enough to the deep-seated heat source that the heat of the cavern walls will be promptly replenished as withdrawn so as to maintain the heat extraction process at an acceptably high rate and temperature.

The volume of the cavern should be great compared to the volume of the heated air exit passageway, which conveniently comprises a bore hole extending from the cavern to a point at or near the earth's surface at which the heat of the gas or gases is utilized. Such a system will operate to maintain the gas (air) sufficiently long in the cavern so that it will be raised to a suitably high temperature, and then to speed it through the exit passageway so that heat transfer and heat loss from the gas to the earth through the passageway walls is minimized. For best operation, the volumes of the cavern and exit passageway will be within certain ranges, as will the retention times of the gas in these places. In accordance with the present invention, very large quantities of heat will be obtained from the geothermal source at very little expense after that incurred for the bore hole drilling and casing operations.

Various objects, details, constructions, operations, uses, and advantages of the invention will be apparent from the following description, taken in conjunction with the illustrative drawing showing by way of example some systems for effecting the methods of the invention, in which drawing:

THE DRAWING

DETAILED DESCRIPTION OF THE INVENTION

Figure 1:
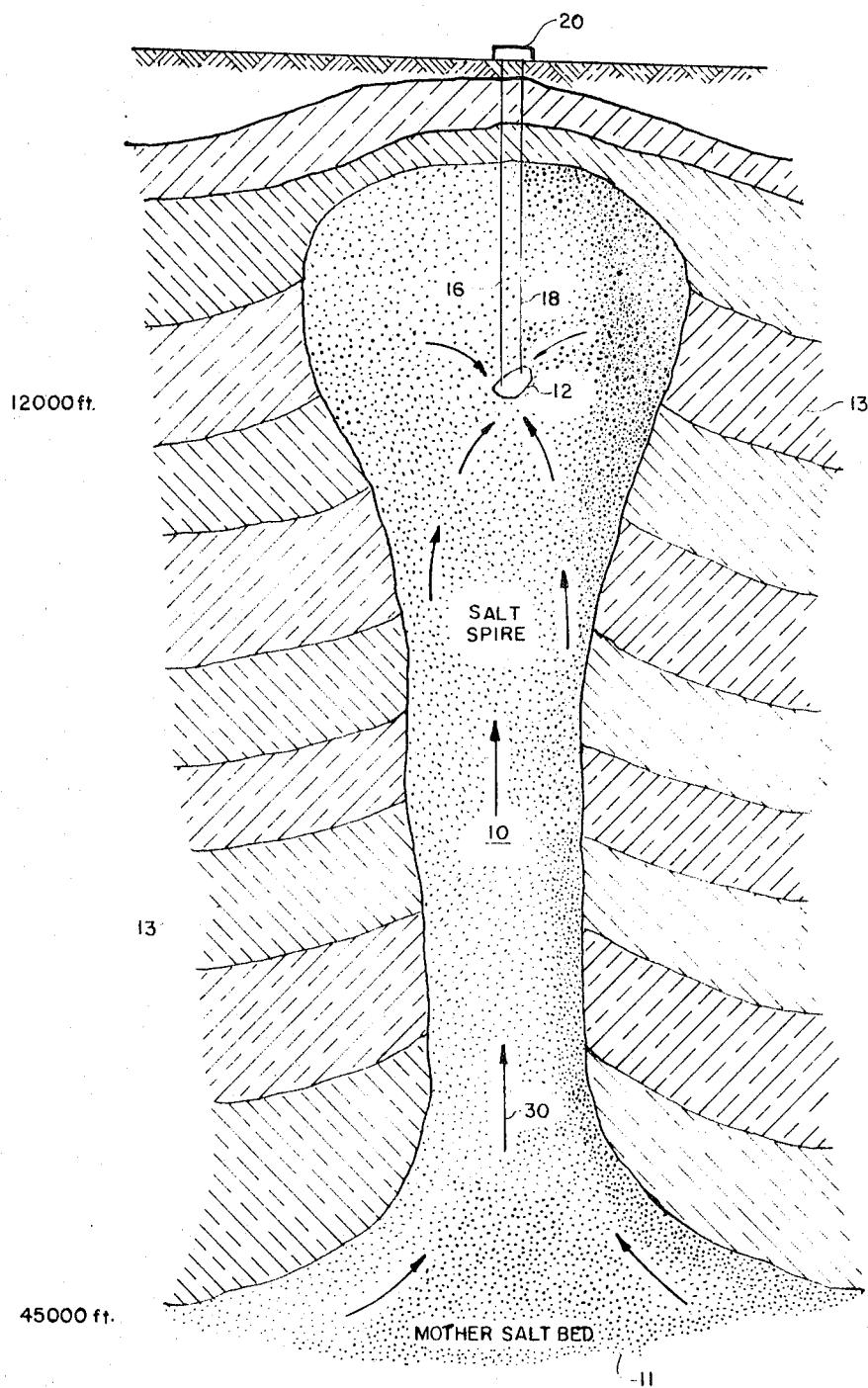
FIG. 1 is a vertical geologic sectional view illustrating a typical system installed in a salt dome in accordance with the present invention.

In FIG. 1 is shown a geological phenomenon, known as a salt spire or dome 10 which had been formed by fluid or plastic flow from a deepseated "mother bed" or the like as shown at 11, and vertical intrusion of the spire or dome portion towards the earth surface through surrounding typical geological strata 13 which are of lesser thermal conductivity. a heat reservoir cavity 12 is created in the dome by first drilling from an appropriate location at the earth's surface a pair of bore holes as shown at 16 and 18, to a relatively great depth such as 12,000–15,000 feet as illustrated, after which a stream of water is flowed down one of the bore holes to dissolve salt below it and between it and the other bore hole through which brine is returned to the surface. The dissolving of the salt leaves a hollow reservoir or cavern 12 in the salt dome after removal of the brine. The cavern then serves as a heat reservoir through which air is passed to remove heat from the cavern wall surfaces conducted thereto through the salt spire 10 from the mother salt bed 11. Directions of air flow to and from the cavern are shown by arrows alongside passageways 16 and 18, and the transmission of heat to the cavern from the inaccessible mother salt bed source of heat is similarly indicated. The heat extracted by the air exiting from the cavern is utilized in any suitable way at an installation or facility as shown schematically at 20, which may be located either at the earth's surface or underground, as preferred.

Figure 2:
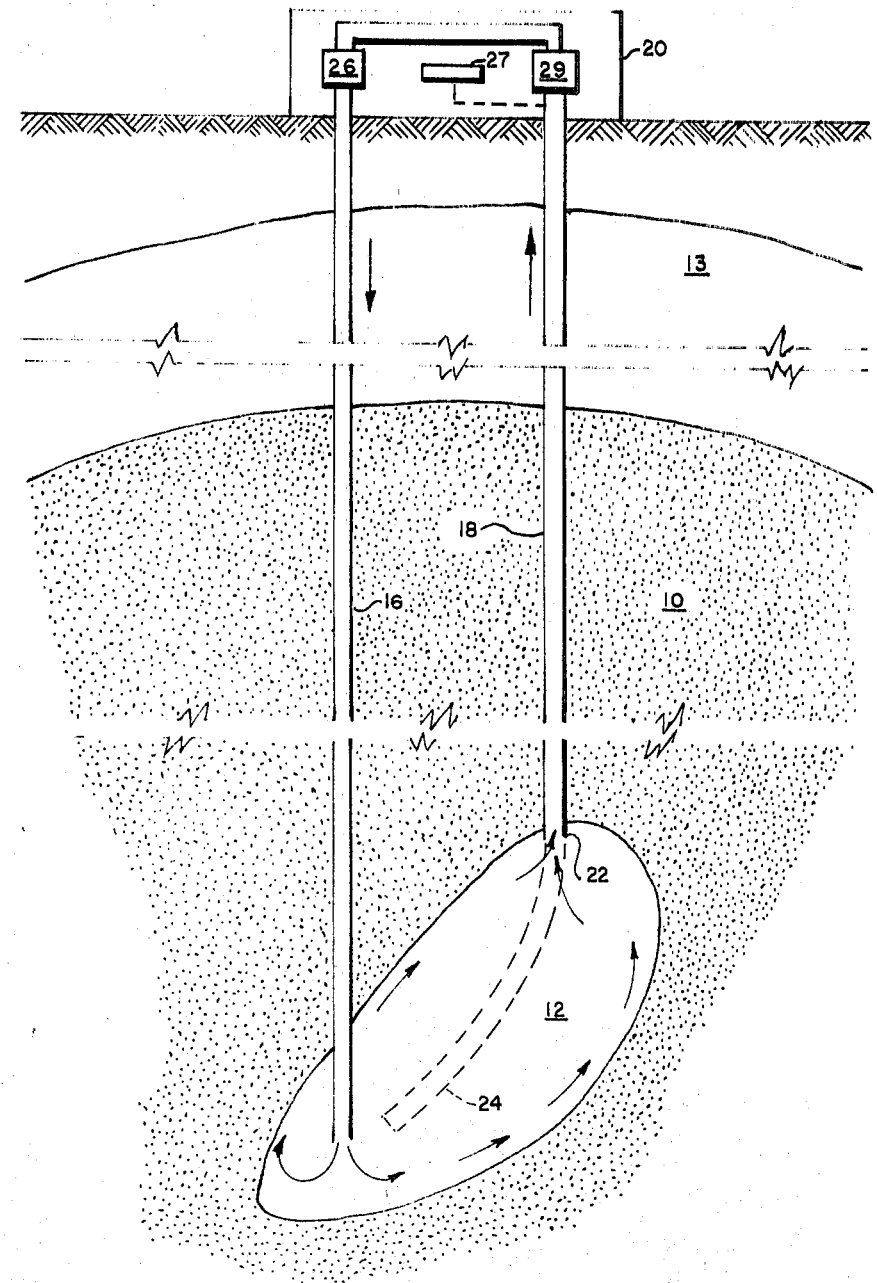
FIG. 2 is a fragmentary view on an enlarged scale of upper and lower portions of the geologic section of FIG. 1, illustrating in more detail, but schematically, a form of heat extraction system and a form of aboveground heat utilization system.

In FIG. 2 in addition to the improved enlarged illustration of the spire, bore holes and cavern, there are shown schematic representations of a typical heat utilization system located aboveground as well as means by which the cavern 12 may be created. Initially, vertical bore holes 16 and 18 may be bored and cased as illustrated, the casing of bore hole 18 ending at 22. However, the bore hole may then be extended and inclined by methods known to the drilling art so as to meet or almost meet the nether end of bore hole 16 as shown at 24. Then upon forcing water downwardly through bore hole passageway 16 any intervening salt between the bottoms of the holes will be dissolved away. The brine produced may be removed and evaporated to solid salt, and continued circulation of water through the passage 24 will ultimately produce a cavern 12 of the type shown.

Figure 3:
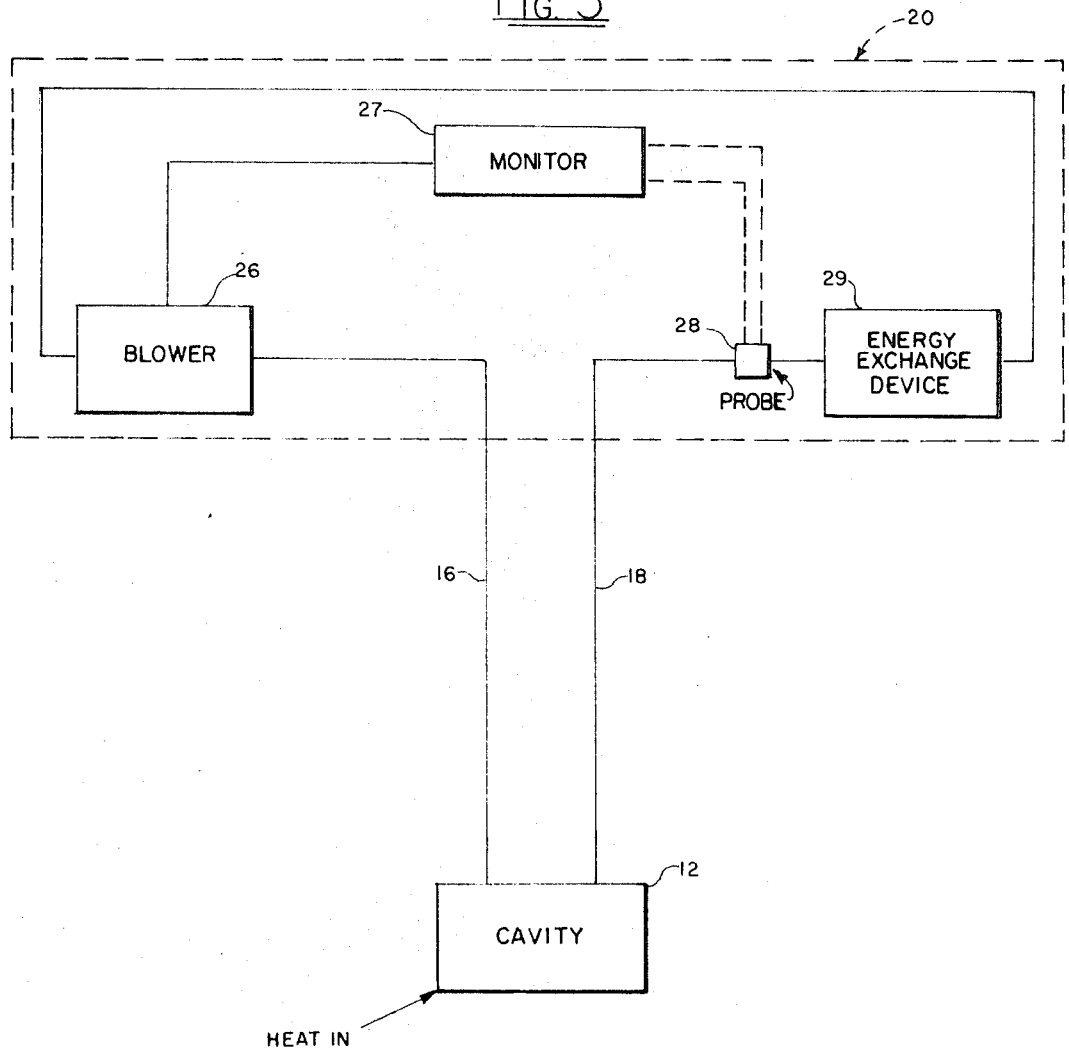
FIG. 3 is a flow diagram for the system of FIGS. 1 and 2.

As is illustrated in both FIGS. 2 and 3, the flow of heat extracting gas through the cavern is preferably automatically controlled. Thus, blower, jet engine or suitable means 26 for creating a high speed flow of air downwardly through passageway 16 is regulated in its operation so as to maintain the desired temperature of the exit gas from passageway 18 being delivered to energy exchange device or facility 29. A monitoring device represented at 27, may be employed responsive to a temperature probe, as shown at 28; or a flow meter or a system responsive to total heat extracted, either or both of which can be substituted for the temperature measuring device or used in conjunction with it. Details of the means of controlling flow rate in response to desired characteristics of the exit gas are not given here since methods for accomplishing such purposes are well known, and do not in themselves constitute novel features of the present invention.

Figure 4:
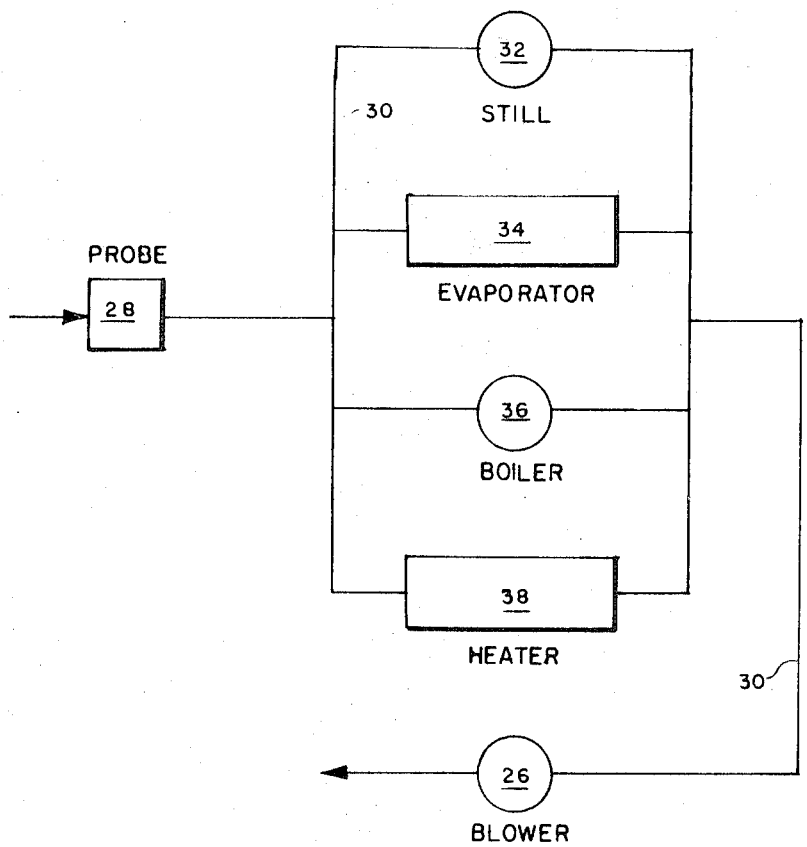
FIG. 4 is a schematic plan view of a plurality of energy exchange devices of different types such as may be employed to utilize the heat energy of the air exiting from the cavern the velocity of the delivered heated air being caused by such plural utilizations to be diminished to readily useful range.

In FIG. 4 various facilities are shown for converting the heat energy of the hot gas exiting from the subterranean heat source to useful work. Thus, high speed hot air leaving cavity 12 through exit passageway 18 and passing through monitoring station component 28 is divided and conveyed by piping 30 such as to still 32 in which a brackish water feed is converted to pure water by means of heat energy extracted from the air; brine evaporation tank 34, in which the passageway of air through heat exchange piping in the tank or by direct contact boils off water and concentrates the brine or crystallizes it to a solid form; boiler 36 in which steam is produced for conversion into electricity in a generator-condenser apparatus, not illustrated; and space heating heat exchanger 38, in which cold water or air may be heated or converted to steam for space heating purposes. Although not illustrated, in some instances a portion of the hot air produced may be utilized directly, and make-up air may be added to the return flow passing through blower 26. Utilization of several such energy conversion facilities, as indicated in FIG. 4, allows the large amount of energy in a high speed exit gas to be used efficiently and at ordinarily handled gas flow rates. The piping and container facilities will of course be sized so as to diminish appreciably the velocity of the gas flowing through such heat exchange devices.

OPERATION OF THE INVENTION

The rock and mineral formations which largely comprises the "crust" or mantle structure of the earth are of relatively low heat conductivity or "insulative" characteristics. Therefore, although they may extend deep into the earth and ultimately contact high temperature geothermal heat sources, they are not capable of satisfactorily transmitting heat from said sources to locations which are accessible to modern mining or bole hole drilling processes and from which the heat can be efficiently and economically recovered. The temperature drop in transmission of fluids from the deep-seated heat source to a recovery location through such normally encountered geologic formations at accessible levels is too great to permit utilization of such heat at high enough temperatures as to render the operation commercially feasible. Geysers, hot springs, heated pools or volcanic flows, or the like are not reliable sources for such purposes, and create other problems such as hazardous working conditions and/or corrosion and/or scaling of the operative equipment.

However, according to the present invention, the heat of the deep-seated heat source in the earth can be efficiently removed when a suitable mineral deposit is located such as a dome or spire of halite; rock salt, or sodium chloride; quartzite; hematite; or the like, as explained hereinabove. Among other such minerals, which may be less preferable but are still usable under proper conditions, are magnetite; grossularite; anhydrite; chlorite; and dolomite; provided of course that geologically they exist in highly efficient thermal continuity with the heat source. In order to obtain a useful rate of heat transfer through the selected mineral deposit from heat source to the heat exchange cavern, the conductivity of the mineral "heat conduit" should be at least $12 \times 10^{-3}$ calories per centimeter per second per °C. As explained hereinabove, the heat conducting mineral formation should extend downwardly for a sufficient distance as to be in communication with a deep-seated heat source at high temperatures. However, pluralities of conductive strata may of course be employed in lieu of a single conductive mineral deposit, provided it is productive of a sufficient heat supply.

It is contemplated in accordance with the present invention, that although quartzite and hematite and the like are known to be heat-conductive minerals, a deposit thereof does not usually possess the advantages of a sodium chloride spire or dome in that it is readily water-soluble and thereby may be readily dissolved to form a heat exchange cavity at an accessible depth. Also, although caverns can be made in insoluble rock/ minerals by blasting; acid or basic dissolving; or by mechanical fracturing, such operations are much more difficult and expensive in comparison to the solution mining of a cavity in a salt dome or spire. Accordingly, although such variants may in some cases be utilizable, the following descriptions will deal primarily with the extraction of geothermal heat from salt domes or spires; because this concerns the highly preferred field of application of the invention.

Salt domes penetrate the earth's crust at various places under both land or water. Geologists have been able to locate such salt spires and domes by observation of the types of neighboring geologic structures, and by deductions from past experience as to where a dome may be located. In more recent years their efforts have been aided in locating such intrusions by measurements of the characteristics of reflected sound or radio waves, much in the manner utilized for locating deposits of oil. Similarly, the height of the spire and the depth of the mother bed of salt which acts as a deep-seated heat source are also ascertainable.

Once a suitable spire is located the bore holes are drilled in the manner previously described in connection with the explanation of the drawing. Then a heat exchange cavern is created by dissolving the salt therebetween with feed water to produce a brine, which may be recovered to produce useful salt. Instead of using two bore holes as shown, it is apparent that a greater number may be employed, and that several caverns may be thus created and interconnected. Alternatively, a single bore hole with concentric casings may be used to provide both the means of addition of water to the cavern area and a passageway for removing the resulting brine.

Following formation of the cavern a relatively cool gas such as air is recycled by being blown or otherwise forced into the cavern; allowed to remain therein for a sufficient period of time to absorb heat from the cavern surfaces by conduction or convection; and then removed from the cavern and delivered to the point of utilization. To attain an economically feasible operation the deep-seated source of heat should be at least 20,000 feet below the surface of the earth, and preferably at least 40,00 or 50,00 feet therebelow. Any such heat source found at a level of less than say 20,000 feet below sea level would not usually be reliable and would probably diminish in temperature after a few years of use.

To maintain the cavern at a high temperature, generally over 200° F. and preferably over 250° F. and more preferably over 300° F., the deepseated heat source should usually be at a substantially higher temperature, generally over 350° F. and preferably higher than 500° F. Also, the heat communication cross-sectional area of the spire between the cavern and the deep-seated heat source should be at least equal to the maximum cross-section of the cavern and preferably at least equal to the total wall surface area of the cavern, and most preferably two or more times that area. By surface area of the cavern is meant the surface of an equivalent geometric shape nearest to its general shape, without allowances for indentations in the cavern walls.

The area relationships above mentioned are requisite for allowing rapid and efficient transfer of heat from the deep-seated heat source to the cavern walls. If the spire is too thin in relation to the cavern size, transfer of heat from the heat source to the cavern will be minimal and would not support the desired high temperature heat extraction/replenishment system. This factor is especially important when a gas such as air is employed as the means of extracting heat from the cavern and delivering it to a point of use. To insure that the cavern heat supply does not diminish, its depth should be at least 5,000 feet below the earth's surface, and will normally be over 10,000 feet below the earth's surface. Preferably, the cavern will be constructed at as great a depth as is economically feasible; the limit being the depth to which bore hole drilling is practicable.

The size of the bore hole(s) will be determined by how a sufficient flow of air to and from the cavern may be attained. Because the air entering the cavern is at a lower temperature than that leaving the cavern, it will be possible to drill the entrance bore hole to a smaller diameter than the exit bore hole for the outlet passageway. The larger the exit passageway the better, because the flow of the heated gas to the earth surface facility will be more rapid with lower heat losses. Thus, if feasible, provision of an exit passageway sized in the upper part of a 20 to 200 square inch cross-sectional area range is preferred. Retention times in the exit passageway should be less than 5 minutes; generally less than 2 minutes; and from 5 seconds to 30 seconds is preferred.

Thus, it is apparent that the cross-sections of the inlet and exit passageways are very small, compared to the volumetric capacity of the cavern. Therefore, the retention times of gas in the passageways are very much shorter than those of the gas when in the cavern. This permits a leisurely flow of air/gas for good heat transfer effect when the gas is in the cavern, and minimizes heat losses from the air/gas when passing from the cavern to point of heat recovery. The cavern will typically be of a volumetric capacity over 100,000 cubic feet, and will preferably be over 1,000,000 cubic feet capacity. Thus, for example, when in the form of a cylinder, the cavern may have a diameter of from 50 to 1,000 feet and a length of from 100 to 10,000 feet. It may be disposed to extend substantially vertically or horizontally, or it may be in an inclined attitude.

Preferred cavern sizes are from 200 to 500 feet in diameter and 500 to 5,000 feet in length. The retention time of gas in the cavern will typically be at least several minutes, and preferably will be of the order of half an hour. Most preferably, the retention time will be as long as possible; from 3 to 100 hours being considered to be excellent. Usually, the retention time is increased to the maximum by locating the inlet and outlet passageways so as to be separated by the length of the cavern. Such arrangement also helps in keeping the cavern swept free of old or "stagnant" gas.

Throughputs of gas to be heated may vary widely, but rates from 20 to 5,000, and preferably 100 to 1,000 cubic feet per second are contemplated. Obviously, the maximum throughput rate is determined by the limitations of high speed air flow through the most restricted portions of the flow system. At the flow rates mentioned, the heat transfer rate may be from 1,000,000 to 10 or 50 million B.t.u. per hour. The higher the flow rate, the less heat is lost while the cavern-heated air moves on to the energy converting station. Therefore, it is apparent that as air/gas is introduced through the inlet passageway it "floats" through the heat-exchange chamber, whereupon it is heated and then rushes upwardly through the exit passageway, as in the manner of a jet engine system.

It has been found that the inlet air/gas need not be introduced under high pressures to obtain such desirable high rates of exit flow. For example, at comparatively low pressures, say from 0.5 to 5 atmospheres, applied to the air/gas at the top of the inlet passageway, high speed flow is assured. This is aided in part by a "chimney" effect through the exit passageway, and of course is aided by the employment of a large sized passageway. Thus, it is possible to obtain exit gas temperatures at the surface of the earth of 180° F. and higher, and in fact temperatures of 200° F. and even as high as 250° F. or more, are obtainable when the system is operating most efficiently. The output temperatures may also be increased by recycling the air/gas system. However, in those instances where it is desired to employ air directly in such a manner as to prevent recycle, high temperatures are also obtainable.

The temperature of the delivered gas may also be increased by insulating the exit pipe. It is undesirable to insulate the inlet passageway because it picks up some heat from the ambient salt dome and actually aids in warming the air as it nears the cavern. If this passageway pipe is to be insulated at all, it will be in the upper portion thereof where it is exposed to cold rock near the surface of the earth. Insulation for the exit passageway may be of any suitable type; such as foamed concrete; foamed plastic; e.g., polyurethane, polyester or polystyrene foams; or "dead" air or "trapped" gas. Although the passageway walls will normally be of metal, such as steel or suitable metal alloy, it is contemplated by this invention that synthetic polymeric materials may also be used, at least for the interior passageways when disposed within a suitable protecting cover.

The present system performs surprisingly well, considering that air and other noncondensible gases are notoriously classed as being of low heat capacities. The relatively poor heat transfer rates from such gases, and the fast passage of such gases through the exit passageway contribute to make it possible for a substantial proportion of the energy content of gas leaving the cavern to be available for utilization at the surface of the earth. High speed transport of the heated air/gas has bee found to be possible at relatively low pressures, thereby avoiding existence of pressure forces in the cavern such as would tend to fracture the spire and promote leakages therefrom. The air may exit at a speed on the order of the speed of sound at the surface of the earth without creating extraordinary stresses on the system, due in part to the tight fit between casings and the bore hole walls and the somewhat plastic nature of the material of the salt spire or dome.

Although the material of a salt spire or dome at the depths below ground contemplated herein is somewhat plastic, a heat-exchange cavern of the type contemplated herein will not tend to close as fast as might be expected, due to the cooling effect of the air passing therethrough; since plasticity is related to temperature. In any case if it should be desired to enlarge the size and consequent heat transfer capacity of the cavern, this can be readily accomplished by recirculating water through it. Such need for an increased capacity may be noted from a drop in the "well head" temperature of the delivered hot air.

Despite the problems one might expect to encounter in utilizing air which is of very low heat capacity as a heat transfer fluid and employing it at high speed flow rates, applicant has discovered that such method is feasible and possesses many advantages. The ready availability of air or similar gases and its safety in use and non-disturbing effect on a salt cavern and/or bore holes, are only some of these advantages. Any moisture entrained in the air is converted to a gas upon heating, and does not interfere with the intended operations. Accordingly, the present invention represents an important advance in the development of methods for extracting "clean heat" from the earth's core, in an economic and efficient fashion. Such heat supplies are therefore relatively cheap, and are utilizable at the well head for many purposes and is accompanied by addition of no pollutants to the earth's surface land, water or atmosphere.

The following example illustrates typical use of the present method, but is not to be considered as a limitation on the invention. Unless otherwise mentioned, all parts are by weight; temperatures are in degrees Farenheit; and measurements are in feet.

EXAMPLE a cavern of the type illustrated in FIGS. 1 and 2 is constructed in a salt spire on the Gulf Coast of Louisiana. The cavern shape is approximately cylindrical, upwardly directed, with an equivalent radius of about 200 feet and a length of about 3,000 feet. The bore hole passageways communicating with the cavern are 12 inch pipes. An air flow of about 1,000 cubic feet per second is maintained by an applied pressure of approximately 1 atmosphere gauge, at the top of the inlet passageway. Air, utilized as a carrier of energy, is recirculated to the cavern, the inlet temperature thereof being about 120° F.

At cavern temperatures in the range of 250 to 350° F., the temperature of the air exiting from the passageway at the surface of the earth is from 180° to 250° F. The higher temperature ranges are developed when the pipe employed is insulated and the linear velocities of the air approach sonic velocity. Thus, at speeds from 500 to 2,000 feet per second in the exit pipe, the highest temperatures are produced, although at speeds from 100 to 500 feet per second effective heating may also be obtained from the outlet gas. Retention times in the bore hole passageways are from 5 seconds to 2 minutes, usually from 10 to 20 seconds, and retention times in the cavern range from 3 to 90 hours, depending on the velocity with which the air is forced through the system.

At an air flow rate of 1,000 cubic feet per second out of the exit passageway the retention time therein is about 16 seconds and the retention time in the cavern is about one-half hour.

The air leaving the well head at a temperature of about 250° F. and returning to the bore hole passageway at about 120° F. supplies over 10,000,000 B.t.u./hour, which is approximately evenly divided between the installations shown in FIG. 4, for purification of brackish water; evaporation of salt brine from a nearby salt cavern; space heating; and the production of electricity.

It is found that when operating under the above conditions there is no indication that the cavern temperature will be sufficiently lowered to make operation inefficient, even after a period of 10 or more years. Furthermore, collapse of such a deep cavern has not been experienced and is not expected. Problems that result from using extremely high speed air/gas flow are correctible by adapting the energy conversion equipment to include large pipe sizes, thereby diminishing flow rates. Also, in some instances, where longer times are needed to effect proper heat transfer from the air to obtain the energy conversion desired, the air may be vented to the atmosphere after heat exhaustion, and make-up air is added with recycle air back into the cavern.

Means for automatic controls of flow rates, as illustrated in FIGS. 2 and 3 are utilized; the preferred control being a temperature control, which causes slowing down of the rate of air flow when the exit air temperature falls. Obviously, such a control also speeds up air flow rate by increasing blower pressure or jet engine air blast speed when recovery temperatures are too high, indicating that the replacement of extracted energy in the cavern might not take place satisfactorily unless flow rates are diminished.

In another embodiment of the invention (not illustrated) if it is desired to improve heat recovery, the insulated exit bore hole passageway may be driven through a non-conductive rock system bordering the salt spire; whereby the lower conductivity of such rock system is utilized to prevent an unwanted decrease in the temperature of the recovered air during its passage to the surface from the cavern.

Instead of the flow rates, heat extraction rates, temperatures, pressures and distances given in this example, other parameters within the ranges previously given in the specification may be employed with good heat extraction effect. The energy conversion equipment utilized may be located above or belowground, and may of course be of any suitable types of equipment for most efficient operation. Therefore, it is to be understood that although the invention has been described with respect to certain working examples and illustrations thereof, it is not to be considered as limited to the specific embodiments described herein, since it is evident that equivalents may be substituted without going beyond the inventive concept or the scope of the invention.

I claim:

1. The method of extracting geothermal heat as a source of useful energy, at a desired rate from otherwise inaccessible depths below ground, which method comprises the steps of:
   a. locating a mineral formation of high heat conductivity extending vertically in thermal continuity from a deep-seated heat source, said heat source being at a depth which is inaccessible by commercially practicable bore hole drilling techniques, and said formation extending to a level which is accessible by commercially practicable bore hole drilling techniques;
   b. establishing a heat well within said formation at an accessible depth within said mineral formation sufficient to assure that heat energy will flow from said source to said heat well so as to substantially constantly replenish heat extracted therefrom at said desired rate;
   c. flowing a comparatively cool gas through said heat well, whereby it acquires heat energy from the heat well at said desired rate without extracting the mineral defining the heat well;
   d. removing the heated gas from the heat well;
   e. transporting it to a point where its heat energy may be utilized; and
   f. utilizing the heat energy in the gas resulting from its contact with the heat well.

2. A method according to claim 1 wherein said mineral formation of high heat conductivity is one which as been formed by fluid or plastic flow and vertical intrusion through surrounding rock formations of a portion of a deep-seated source of said mineral which is also the deep-seated heat source.

3. A method according to claim 2 wherein the mineral formation is a salt dome; the heat well is a cavern in the salt dome; the inaccessible heat source is a mother salt bed; the gas flowing through the cavern and removing heat from it is air, and the air is transported to the cavern and removed therefrom via bore hole(s).

4. A method according to claim 3 wherein the cavern in the salt dome is at a depth greater than 5,000 feet below the surface of the earth; the salt dome or spire is in communication with an inaccessible heat source at least 20,000 feet below the surface of the earth; the heated air is removed from the cavern by means of a bore hole passageway; and the volume of such passageway is substantially less than the volume of the cavern.

5. A method according to claim 4 wherein the cross-sectional area of the salt dome or spire below the level of said cavern is at least equal to the total surface area of the cavern; the cavern is of a volume of at least 1 million cubic feet; the temperature in the cavern is at least 200° F.; and the cross-sectional area of the bore hole exit passageway is at least 10 square inches.

6. A method according to claim 5 wherein the cavern is produced by solution mining of sodium chloride and is at a depth greater than 10,000 feet below the surface of the earth; the salt dome or spire is in communication with an inaccessible bed of salt comprising a heat source located at least 40,000 feet below the surface of the earth; the temperature in the cavern is maintained above 250° F. by control of the speed of extraction of heat energy by regulation of the air flow rate; the retention time of air in the cavern is at least one-half hour; and the retention time of air in the exit passageway in the bore hole is less than 5 minutes.

7. A method according to claim 6 wherein the retention time of air in the cavern is from 3 to 100 hours; the retention time of air in the exit passageway in the bore hole is from 5 seconds to 2 minutes; the volume of air flowing is from 20 to 5,000 cubic feet per second; the bore hole exit passageway is of 20 to 200 square inches cross-section; and heat recovery from the underground heat source is from 1,000,000 to 50,000,000 B.t.u./hr.

8. A method according to claim 7 wherein the gas retention time in the exit passageway is from 5 to 30 seconds.

9. A method according to claim 8 wherein heat is extracted from the air during the concentration and/or evaporation of salt brine obtained from the salt deposit in which the cavern was solution mined.

10. A method of extracting geothermal heat from a deep-seated heat source which is inaccessible by commercially practicable bore hole drilling techniques; which method comprises:

flowing a comparatively cool gas through a cavern in a vertically extending mineral formation of high heat conductivity which is in thermal communication with said deep-seated heat source;

removing the heated gas from the cavern and transporting it to a point where its heat energy may be utilized, and then utilizing the heat energy in the gas resulting from its dwell in the cavern;

the cavern being at a depth greater than 5,000 feet below the surface of the earth and the inaccessible heat source being at least 20,000 feet below the surface of the earth;

the thermal connection between the cavern and the inaccessible heat source being the vertically extending conductive mineral formation which is of a cross-sectional area at least equal to the cavern wall area;

the heated gas being removed from the cavern by means of a bore hole exit passageway the volume of which is much less than the volume of the cavern;

the cross-sectional area of the exit passageway being at least 10 square inches;

the cavern volume being at least 1,000,000, cubic feet;

the dwell of the heated gas in the exit passageway being less than 5 minutes; the dwell of the gas in the cavern being at least one-half hour;

the temperature of the cavern being at least 250° F.;

and the temperature of the gas exiting at the point of utilization being at least 180° F.

11. A method according to claim 10 wherein the deep-seated heat source is a mother salt bed; the vertically extending mineral formation is a salt dome or spire; the comparatively cool gas circulated through the cavern is air; the cavern is at a depth greater than 10,000 feet; the mother salt bed is at a depth greater than 40,000 feet; the cross-sectional area of the exit passageway is at least 25 square inches; the dwell of the air in the exit passageway is from 5 to 30 seconds; the dwell of the air in the cavern is from 3 to 100 hours; the air is moved speedily through the exit passageway; the temperature of the air exiting at the point of utilization is at least 220° F.; and the temperature of the air leaving the cavern is maintained above 250° F. by control of the speed of extraction of heat energy from the cavern by regulation of the rate of air flow.

* * * * *